United States Patent [19]

Honikman

[11] 4,052,000
[45] Oct. 4, 1977

[54] SOLAR ENERGY AUGMENTED WATER HEATING SYSTEM

[75] Inventor: Terence C. Honikman, Santa Barbara, Calif.

[73] Assignee: Allen K. Cooper, Santa Barbara, Calif.; a part interest

[21] Appl. No.: 677,912

[22] Filed: Apr. 19, 1976

[51] Int. Cl.² .................. F24J 3/02; F24D 3/00
[52] U.S. Cl. ........................ 237/1 A; 126/271; 219/279
[58] Field of Search .............. 126/270, 271, 400; 237/1 A, 8 R; 219/279, 282, 341, 378

[56] References Cited

U.S. PATENT DOCUMENTS

| | | | |
|---|---|---|---|
| 1,338,644 | 4/1920 | Cartter et al. | 237/1 A |
| 1,888,620 | 11/1932 | Clark | 126/271 |
| 2,396,338 | 3/1946 | Newton | 126/271 |
| 2,544,474 | 3/1951 | Swanton, Jr. | 126/271 |
| 2,553,302 | 5/1951 | Cornwall | 126/271 |
| 3,910,490 | 10/1975 | Saypalia, Jr. | 237/1 A |
| 3,931,806 | 1/1976 | Hayes | 126/271 |
| 3,977,601 | 8/1976 | Bearzi | 237/1 A |

Primary Examiner—John J. Camby
Assistant Examiner—Henry C. Yuen
Attorney, Agent, or Firm—Frederick E. Mueller

[57] ABSTRACT

Solar energy is utilized to augment the heater of a water heating system, such as a domestic hot water system, having a water storage and heating tank by conducting water to the tank through a solar energy storage tank and circulating a heat transport liquid through a solar collector and selectively through the solar tank and water tank in response to the collector temperature, the solar tank temperature, and the water tank temperature, in a manner such that heat transport liquid flow occurs in a normal solar energy storage mode through the collector and the solar tank under a first set of temperature conditions, and cascade fashion through the collector, the water tank, and then the solar tank in a cascade solar energy storage mode under a second set of temperature conditions and in a maximum solar energy storage mode under a third set of temperature conditions. Heat transport liquid flow may occur through the solar collector and solar tank in response to a preset low collector temperature to prevent freezing of liquid in the collector, and the water tank heater may be shut off in response to a high collector and water temperature condition to conserve energy. The invention also provides novel solar collector and tank heat exchanger structures for the heating system.

24 Claims, 5 Drawing Figures

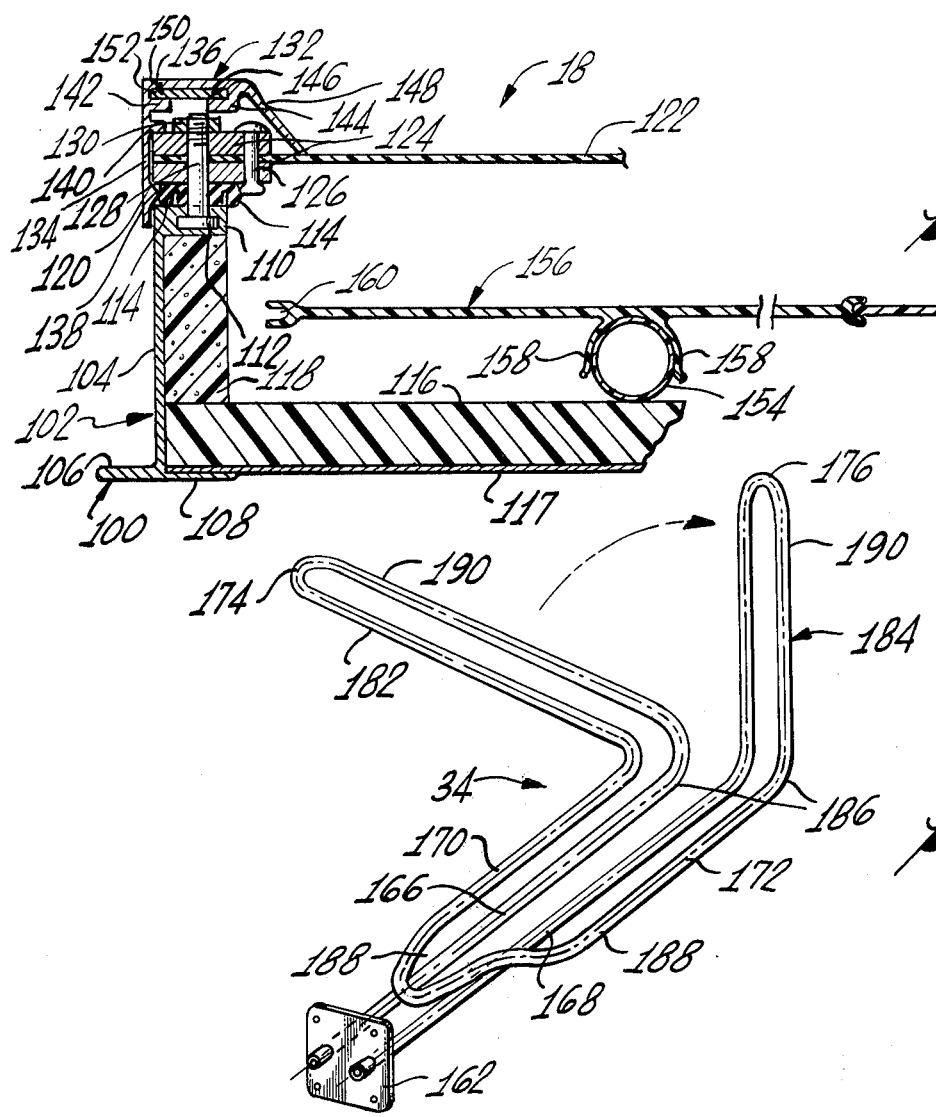
Fig. 3
Fig. 4
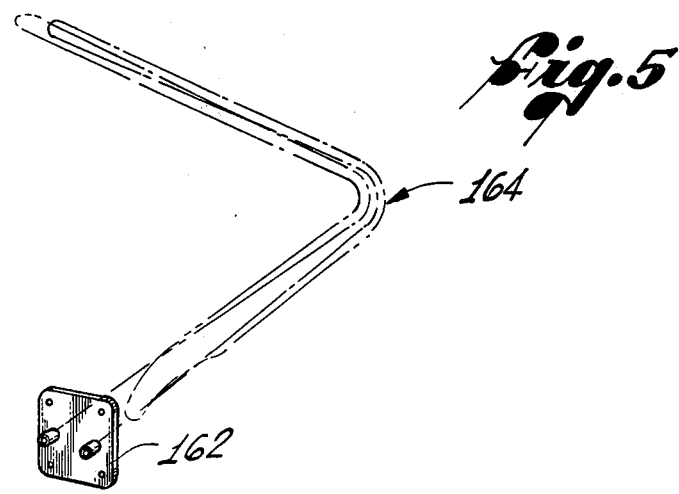
Fig. 5

SOLAR ENERGY AUGMENTED WATER HEATING SYSTEM

BACKGROUND OF THE INVENTION

1. Field of the Invention

This invention relates generally to the utilization of solar energy for heating purposes and more particularly to a novel cascade storage method of and apparatus for utilizing solar energy to augment the heater of a water heating system, such as a domestic hot water system.

2. Prior Art

At the present time, there is an ever increasing trend in the direction of solar energy utilization for both electrical power generating and heating purposes. This invention is concerned wih utilizing solar energy for heating purposes and more particularly for augmenting the heater of a water heating system of the kind having a water storage and heating tank. A common example of such a heating system is a domestic hot water system. This invention is primarily concerned with and will be described in the context of such a domestic hot water system.

A conventional domestic hot water system includes a water heater having a heating tank with a water inlet connected to the city water supply and an outlet connected to a hot water service line. Within the tank is a water heater, such as a gas burner or electrical heating element, which is controlled by a thermostat in the tank in such a way that the heater turns off when the water in the tank reaches a preset maximum set point temperature and on when the water cools to a lower minimum set point temperature. In normal heater operation, the heater cycles on and off in response to hot water consumption and heat loss from the heater tank.

It is known to utilize solar energy to augment the heat source of such a hot water system and thereby reduce the energy consumption of the system. By way of example, U.S. Pat. No. 1,888,620 describes such a solar energy augmented hot water system. Other solar energy augmented heating systems are described in U.S. Pat. Nos. 2,575,478; 2,396,338; 3,152,442; and 2,713,252.

SUMMARY OF THE INVENTION

This invention provides a novel solar energy augmented cascade storage water heating method and heating system. The cascade storage system embodies a water storage and heating tank which, in the described embodiment of the invention, may comprise an essentially conventional water heating tank. In this disclosure, the above tank is referred to simply as a water tank.

According to the present invention, a second water storage and heating tank, referred to as a solar energy storage tank, or simply a solar tank, is connected in series flow arrangement with the water tank in such a way that the water to be heated flows first through the solar tank and then through the water tank. Associated with these tanks is a solar heating system including a solar energy collector, and means for circulating a heat transport liquid, such as water, through the collector and selectively through the solar and water tanks back to the collector in four different modes in response to the collector exit temperture (collector temperature), the solar tank water temperature (solar tank temperature), and water tank water temperature (water tank temperature). These four operating modes are (1) normal solar energy storage mode (normal mode), (2) cascade solar energy storage mode (cascade mode), (3) maximum solar energy storage mode (maximum storage mode), and (4) collector warming mode (warming mode).

In the normal mode of the water heating system, heat transport liquid flow occurs only through the solar collector and solar tank to heat and thereby store solar energy in the water in the solar tank. In the cascade mode and in the maximum storage mode, heat transport liquid flow occurs cascade fashion through the solar collector, then through the water tank, and then through the solar tank to heat and thereby store solar energy in water in both tanks.

The water heating system is controlled by an automatic controller in response to the collector temperature, solar tank temperature, and water tank temperature in a manner such that the system operates in its normal mode when the collector temperature exceeds the solar tank temperature and the water tank temperature at least equals a preset maximum set point temperature of water tank. The heating system operates in its cascade mode when the collector temperature exceeds the water tank temperature and the water tank temperature drops below its maximum set point temperature. Operation of the heating system in its maximum energy storage mode occurs when the temperature conditions are not such as to cause system operation in either its normal mode or cascade mode but yet the collector temperature exceeds the water tank temperature by some preset temperature differential or constant. Finally, system operation in its collector warming mode occurs when the collector temperature drops to some point above freezing. An energy saving feature of the system resides in the fact that when the collector temperature and the water tank temperature exceed some preset temperature levels, such as the maximum and minimum set point temperatures, respectively, of the water tank, the automatic controller turns off the heater of the water tank.

The present cascade storage water heating system has several advantages. The foremost of these advantages are: (1) The ability to match storage temperature to the available solar energy level and thus increase collector and system efficiency. (2) The ability to provide a relatively large water volume, and hence solar energy storage volume, without incurring the expense of an ASME rated tank, which is required by code whenever the tank volume exceeds 120 gallons. (3) The ability to use an existing hot water tank of a domestic hot water system as a portion of the required storage volume, thereby reducing the cost of installing the present cascade storage system. (4) The ability to turn off the water heater and thereby conserve energy when sufficient solar energy is available. (5) The ability to preheat water (in the solar tank) at a lower temperature than the water tank temperature while the water tank temperature is at or above its maximum set point temperature, thus resulting in further increased solar collector and heating system efficiency.

Other aspects of the invention are concerned with a novel heat exchanger construction for conducting the heat transport liquid through the solar and water tanks in heat transfer relation to the water in the tanks and a novel solar collector construction.

DRAWINGS

FIG. 3 is an enlarged fragmentary section through the solar collector of the invention;

FIG. 4 is an enlarged perspective view of the heat exchanger of the invention shown in the position it normally occupies within the solar and water tanks of the heating system; and FIG. 5 is a perspective view of the heat exchanger in a folded configuration wherein it is adapted for installation in the tanks.

PREFERRED EMBODIMENT

Figure 1:
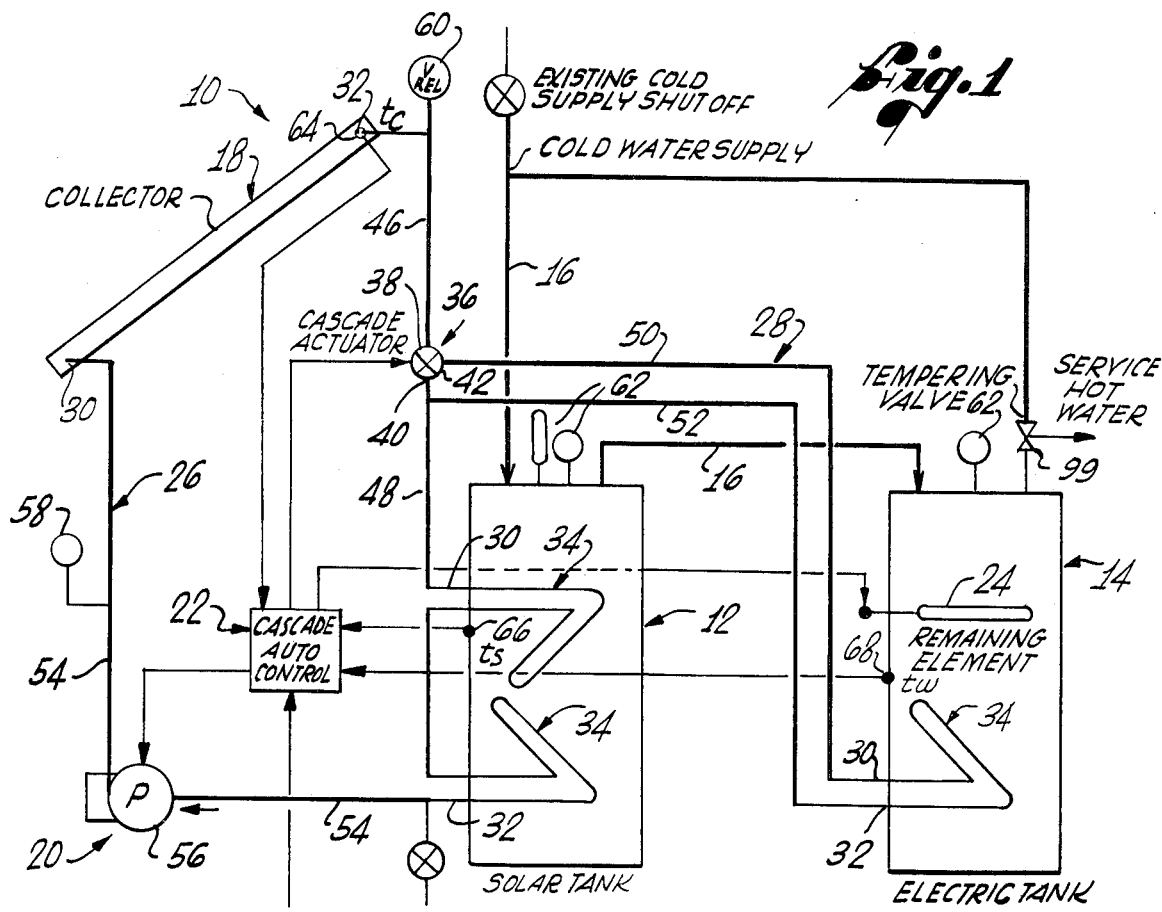
FIG. 1 is a diagrammatic illustration of a solar energy augmented water heating system according to the invention.
Figure 2:
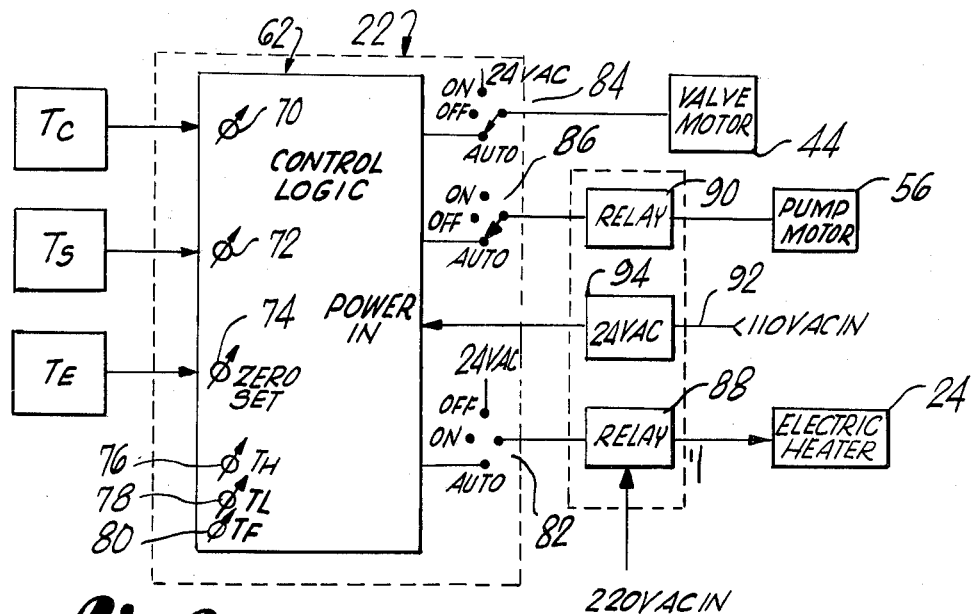
FIG. 2 is a schematic electrical diagram of the heating system.

Referring first to FIG. 1 of the drawings, the cascade storage solar energy augmented water heating system 10 of the invention, which may be a domestic hot water system, comprises, in general terms, a pair of water storage and heating tanks 12 and 14 referred to herein as solar storage and water tanks, respectively. These tanks are connected in series flow arrangement in a water supply line 16 for conducting water first through the solar tank 12 and then through the water tank 14. The heating system further includes a solar energy collector 18 and means 20, including an automatic controller 22, responsive to the collector temperature $t_c$, solar tank temperature $t_s$, and water tank temperature $t_w$ for circulating a heat transport liquid, such as water, through the collector and selectively through the solar and water tanks in the four different operating modes of the system mentioned earlier. These modes are normal mode, cascade mode, maximum storage mode, and collector warming mode.

Water tank 14 has a water heater 24 which is controlled by the controller 22 in essentially the same manner as a conventional water tank heater to turn on at a preset minimum set point temperature $t_l$, typically on the order of 90° to 110° Farenheit, and off at a preset maximum set point temperature $t_h$, typically on the order of 140°–160° F.

The automatic controller 22 operates the water heating system 10 on its normal mode when the collector temperature $t_c$ exceeds the solar tank temperature $t_s$ and the water tank temperature $t_w$ is at or above the maximum set point temperature $t_h$ of the water tank. In this mode, the circulating flow of the heat transport liquid occurs along a first normal flow path 26 through a solar collector 18 and solar tank 12 to effect solar energy storage in the tank.

The automatic controller operates the heating system in its cascade mode when the collector temperature $t_c$ exceeds the water tank temperature $t_w$ and the latter temperature is below the maximum set point temperature $t_h$. In this mode, the circulating flow of heat transport liquid occurs along a second, cascade flow path 28 through the solar collector 18, then the water tank 14, and then the solar tank 12 to effect solar energy storage in both tanks.

Operation of the water heating system in its maximum storage mode under the control of the automatic controller 22 occurs when the temperature conditions in the system are not such as to cause system operation in either its normal or cascade modes and yet the collector temperature $t_c$ exceeds the water tank temperature $t_w$. In this maximum storage mode, the circulating flow of heat transport liquid occurs along the cascade flow path 28 through the water tank 14 and then the solar tank 12 in the same manner as in the cascade mode.

Finally, the heating system is operated by the controller 22 in its collector warming mode when the collector temperature $t_c$ drops to or below a present minimum collector temperature $t_f$ above freezing. In this warming mode, the heat transport liquid is recirculated along the normal flow path 26 through the solar tank 12 and solar collector 18 to warm the collector and thereby prevent freezing of liquid in the collector.

Referring now in more detail to the drawings, the solar tank 12, water tank 14, and solar collector 18, have heat transport liquid inlets 30 and outlets 32. Within the solar tank 12 are a pair of heat exchangers 34 and within the water tank 14 is a single heat exchanger 34. As will be explained presently, heat transport liquid flow occurs through these heat exchangers from the tank inlets 30 to the tank outlets 32. The construction of the solar collector 18 and the heat exchangers 34 consititute important features of the invention and will be explained presently in connection with FIGS. 3–5. Suffice it to say at this point that the solar collector has a liquid passage through which the heat transport liquid circulates from the collector inlet 30 to the collector outlet 32 to effect solar heating of the liquid. The heat exchangers 34 comprise tubes through which the heat transport liquid flows in heat transfer relation to the water in their respective tanks 12 and 14 to transfer heat to the water.

Heat transfer liquid recirculating means 20 comprises a cascade controller valve 36 having an inlet 38, two outlets 40, 42, and valving means (not shown) operable by an electrical valve motor 44, such as a solenoid, to normal and cascade positions. In the normal position of the valving means, valve inlet 38 communicates with valve outlet 40. In the cascade position of the valving means, the valve inlet communicates with the valve outlet 42.

Valve inlet 38 is connected to the solar collector outlet 32 by a liquid conduit or flowline 46. Valve outlet 40 connects to the solar tank inlet 30 through a liquid line 48. Connecting the valve outlet 42 to the water tank inlet 30 is a liquid line 50, and connecting the water tank outlet 32 to the line 48, downstream of the cascade controller valve 36, is a liquid line 52. Finally, the solar tank outlet 32 connects to the solar collector inlet 30 through a liquid line 54 containing a pump 56. This pump is operable to pump heat transport liquid through the system in the direction of the arrow in FIG. 1.

From the above description of the recirculating means 20, it will be understood that when the cascade controller valve 36 occupies its normal position with the pump 56 operating, heat transport liquid flow occurs from the pump outlet, through the line 54, the solar collector 18, line 46, valve 36, line 48, solar tank heat exchangers 34, and line 54, back to the pump. This heat transport liquid flow path constitutes the noraml flow path 26. Assuming that solar collector 18 is exposed to solar radiation, the transport liquid is heated during its flow through the collector and transfers its heat to the water in the solar tank 12 during flow through the solar tank heat exchangers 34.

When the cascade controller valve 36 occupies its cascade position with the pump 56 operating, heat transport iiquid flow occurs from the pump, through line 54, solar collector 18, line 46, valve 36, line 50, water tank heat exchanger 34, line 52, line 48, solar tank heat exhangers 34, and line 54 back to the pump. This transport liquid flow path comprises the cascade flow path 28. In this case, the heat transport liquid is again heated by solar radiation in the solar collector 18 and transfers heat to the water in the water tank 14 during its flow through the water tank heat exchanger 34 and thereafter to the water in the solar tank 12 during its flow through the tank heat exchanger 34.

If desired, the liquid line 54 may connect to a hydraulic accumulator 58 for maintaining a desired liquid line pressure. A pressure relief valve 60 is connected to the line 46. The tanks 12 and 14 have pressure and temperature guages 62.

Automatic controller 22 embodies a control logic circuit 62 for effecting the various operating modes of the heating system explained earlier. Logic circuit 62 is electrically connected to a temperature sensor 64 responsive to the solar collector liquid exit temperature $t_c$, a temperature sensor 66 responsive to the solar tank water temperature $t_s$, and a temperature sensor 68 responsive to the water tank water temperature $t_w$. The logic circuit has zero set adjustments 70, 72, 74, for the temperature sensors and presetting adjustments 76, 78, 80, for the water tank maximum and minimum set point temperatures $t_h$, $t_l$, and a collector warming point temperature $t_f$. The water tank heater 24, in this instance an electrical heating element, valve motor 44, and pump (motor) 56 are connected to the logic circuit through off/on/auto selector switches 82, 84, and 86 and, in the case of the heater and pump, also relays 88 and 90. Electrical power is supplied to the control circuit through an electrical power line 92 containing a step down transformer 94.

The controller logic circuit 62 may comprise any suitable logic for controlling the water heating system in response to the various system temperatures referred to earlier, in such a way as to effect the several system operating modes heretofore mentioned, namely normal mode, cascade mode, maximum storage mode, and collector warming mode. The logic circuit also turns the water tank heater 24 off and on at the water tank set point temperatures $t_l$, $t_h$ in essentially the same way as in a conventional water heater.

Except when the temperature conditions in the water heating system 10 correspond to the cascade flow temperature conditions discussed above, that is except in the cascade solar energy storage mode and maximum solar energy storage mode, the controller logic circuit 62 retains the cascade controller valve 36 in its normal position and operates the pump 56 in response to the collector and solar tank temperatures $t_c$, $t_s$ as follows. When the collector temperature $t_c$ exceeds the solar tank temperature $t_s$ plus a preset temperature differential or constant K, the controller logic energizes the pump to circulate heat transport liquid through the normal flow path 26. If the collector temperature drops blow the solar tank temperature $t_s$ plus a smaller temperature constant L, the logic circuit turns the pump off. Thus, the pump turns on and off in response to the collector and solar tank temperatures to recirculate heat transport liquid through the collector and solar tank to effect solar energy storage in the solar tank only when the collector temperature exceeds the solar tank temperature. This is the normal operating mode of the water heating system.

When the collector temperature $t_c$ exceeds the water tank temperature $t_w$ plus a temperature constant M, and the water tank temperature $t_w$ is less than the maximum water tank set point temperature $t_h$, the logic circuit 62 operates the cascade controller valve 36 to its cascade position and operates the pump 56 in response to the collector and water tank temperatures $t_c$, $t_w$ in much the same manner as in the normal operating mode. The logic circuit turns the pump on when $t_c$ exceeds $t_w$ plus a larger temperature constant N and off when $t_c$ drops below $t_w$ plus a smaller temperature constant Q. Thus, the pump turns on and off in response to the collector and water tank temperatures $t_c$, $t_w$ to circulate heat transport liquid cascade fashion through the collector, the water tank, and then the solar tank to effect solar energy storage in both tanks. This is the cascade storage mode of the system.

Assume now that the heating system is operating in its normal mode, with the controller valve 36 in its normal position and the pump 56 turning on and off in response to the collector and solar tank temperatures $t_c$, $t_s$ as explained earlier. Assume further that during a period when the pump is off due to the collector temperature $t_c$ being less than the solar tank temperature $t_s$ plus the larger temperature constant K, that the collector temperature $t_c$ is equal to or greater than the maximum water tank temperature $t_h$ plus a temperature constant P. Under these conditions, the logic circuit 62 operates the controller valve 36 to its cascade position and starts the pump 56 to operate the system in its maximum energy storage mode. In this mode, heat transport liquid flow occurs through the cascade flow path 28 to effect additional solar energy storage in the water tank 14.

The above maximum energy storage temperature conditions should occur only very infrequently so that the resulting energy exchange between the solar tank 12 and the water tank 14 via the solar collector 18 will not cause unacceptable losses. If the need arises, however, to completely avoid any such losses, a second cascade controller valve could be installed to bypass the solar tank in the maximum energy storage mode. Alternatively, a three position cascade controller valve could be used instead of the two position valve 36.

If the collector temperature $t_c$ drops to or below the minimum collector set point temperature $t_f$, which will be preset at some level above freezing, the controller logic circuit 62 operates the heating system in its collector warming mode to circulate heat transport liquid along the normal flow path 26 through the solar collector 18 and the solar tank 12 to warm the solar collector 18 and prevent freezing of liquid in the collector.

According to an additional energy saving feature of the invention, the logic circuit 62 is arranged to turn off the water tank heater 24 when the water tank temperature $t_w$ is relatively high and the collector temperature $t_c$ exceeds the water tank temperature. For example, the heater may be turned off by the controller logic when the collector temperature $t_c$ exceeds the water tank maximum set point temperature $t_h$ and the water tank temperature $t_w$ exceeds the minimum set point temperature $t_l$.

The foregoing system operation is summarized in tabular form below.

| TEMP. CONDITIONS | MODE | PUMP | |
|---|---|---|---|
| | | ON: | OFF: |
| All Except: $t_w \geq t_h$ or $t_c < t_w + Q$ | Normal Storage | $t_c > t_s + K$ | $t_c < t_s + L$ |
| $t_c > t_w + M$ and $t_c > t_h + P$ | Cascade Storage | $t_c > t_w 30 N$ | $t_c < t_w + Q$ |
| $t_c > t_w + P$ and | Maximum | $t_c > t_w + P$ | $t_c < t_w + P$ |

-continued

| TEMP. CONDITIONS | MODE | PUMP | |
|---|---|---|---|
| $t_c \leq t_s + L$ $t_c \cong t_f$ | Storage Collector Warming | $t_c > t_f$ | $t_c \leq t_f$ |

The several temperature differential constants K, L, M, N, Q, and P may have various values. Typically, however, constants K, M, N, and P will have values in the range of 8°–10° and constants L, Q will have values in the range of 2°–3°.

A cold water tempering valve 99 is connected between the water supply line 16 and the hot water service line from the water tank 14.

The on/off/auto switches 82, 84, 86 permit manual operation of the system if desired.

Reference is now made to FIG. 3 illustrating, in fragmentary fashion, the construction of the solar collector 18. This collector has a generally hollow panel-like configuration and includes a rectangular frame 100 comprising four side members 102, only one of which is shown in transverse cross section. The side frame members, which may be extrusions, are identical, except possibly for length, depending upon the rectangular dimensions of the collector panel, and are joined at the panel corners in any convenient way. It will be understood, therefore, that the following description of the collector panel applies to all four sides of the panel.

Each frame member 102 has a normally upright wall 104 with outwardly and inwardly directed flanges 106, 108 along its normally lower edge. The outer flange 106 provides a mounting flange and may be apertured to receive bolts or screws for attaching the panel to a supporting structure, such as a roof. Along the upper edge of wall 104 is a relatively thick inwardly directed flange 110 containing a longitudinal keyway 112 opening through the upper side of the flange and having a pair of upstanding ribs 114 on its upper surface at and along opposite sides of the keyway.

Positioned within the bottom of the collector frame 100 is a panel 116 of thermal insulating material, such as foam plastic, having a protective metallic film 117 bonded to its underside. Each edge of this insulating panel rests on and is adhesively bonded to or otherwise secured to the lower inner flange 108 of the adjacent frame member 102. Positioned against the inner side of the frame member wall 104, snugly between its upper flange 110 and the insulating panel 116, is a strip 118 of thermal insulating material, such as foam plastic. At the upper side of the upper flange 110, are a pair of resilient sealing strips 120 of generally inverted U-shape cross section shaped to fit over corresponding ones of the upper flange ribs 114 in the manner shown.

Spanning the upper side of the solar collector frame 100 is a solar radiation transmitting window panel 122 of a material having relatively high transmissivity for solar radiation. By way of example, the window panel may be a Tedlar covered glass fiber sheet of about 0.03 inches of thickness with a transmissivity of about 0.90.

Each edge of the window panel 122 is sandwiched between a pair of mounting bars 124 which are secured to the panel by rivets 126. The window panel is supported on the upper side of the collector frame 100 with the lower mounting bar 124 along each panel edge seating on the adjacent pair of elongate frame sealing strips 120. Each panel edge is secured to the adjacent frame member 102 by spaced bolts 128 (only one shown). The heads of these bolts fit slidably in the keyway 112 of the respective frame member and have shanks which extend upwardly between respective sealing strips 120, and through panel bars 124 and panel edge. Nuts 130 threaded on the upper ends of the bolt shank are tightened to firmly clamp each window panel edge against the sealing strips to seal the collector against entrance of dirt and moisture into the collector interior.

Overlying each edge of the window panel 122 is a snap action edge cap 132 which may be an extrusion. This edge cap has a generally channel-like cross section and includes two right angle flanges 134, 136. The depending side flange 134 is formed at its inner side with a lower tapered, longitudinal locking rib 138, an intermediate longitudinal rib 140 some distance above the lower rib 138, and an upper longitudinal rib 142 just above the intermediate rib 140. The upper horizontal edge flange 136 is formed at its underside with a longitudinal rib 144 of L cross section which forms, with the upper flange, the upper edge portion of the depending flange 134, and the upper depending flange rib 142, a keyway-like channel 146. Along the inner edge of the upper flange 136 is a downwardly and inwardly angled flange lip 148.

Each edge cap 132 is sized and shaped to fit over an edge of the collector window panel 122 in the manner shown in FIG. 3 with the edge cap flange 134 depending across the outer edges of the respective panel mounting bars 124, the upper edge cap flange 136 overlying the adjacent panel mounting bars 124 with clearance for the bolts 128, and the upper flange lip 148 extending toward and seating against the front or top side of the window panel. The depending locking rib 138 and intermediate rib 140 are spaced to snugly straddle the adjacent panel mounting bars 124, as shown, with the lower tapered rib projecting in the wedging relation between the lower bar and the upper edge of the collector frame member 102. The adjacent ends of the edge caps 132 are joined at the corners of the collector frame by L-shaped corner straps 150 (only one shown) whose legs 152 fit snugly in the ends of the adjacent edge cap channels 146 and are secured to the caps by dimpling their upper flanges 136 into the strap legs.

A typical solar panel according to the invention may have rectangular dimensions on the order of 4 feet by 10 feet. Virtually the entire expanse of this panel is spanned by the window panel 122. As a consequence, the window panel tends to sag at its center. According to a feature of the invention, excessive sagging of the window panel is avoided by sizing and installing the panel in such a way that it is placed under edgewise tension in the finished collector. To this end, the window panel mounting bars 124 may be slightly bowed, such that they arch inwardly toward the center of the panel prior to installation.

Within the solar collector panel 18 is a liquid conductor 154 for conducting the heat transport liquid through the collector from its inlet 30 to its outlet 32 in such a way that the liquid is heated by solar radiation incident on the collector. In this case, the liquid conductor comprises a high thermal conductivity metal tube, such as a copper tube, bent into a serpentine or other configuration, such that the tube effectively spans virtually the entire interior area of the collector. The tube ends are connected to the collector inlet and outlet 30, 32, respectively. The tube rests against the rear thermal insulating panel 116 of the collector.

Attached to the solar collector tube 154 in heat transfer relation thereto are interconnected solar energy absorbing fins 156 which together provide a panel of large solar energy absorbing surface area. These fins, which may be aluminum extrusions, are attached to the tube by clip-like arms 158 which snap over the tubes. The adjacent aligned fins on adjacent parallel portions of the tube may be interlocked to one another by interengagable bead and socket formations 160 on the edges of the fins. The fins may be coated with an electrically deposited film of molybdenum oxide forming a selective surface having an absorbtivity of about 0.95 and an emmisivity of about 0.30.

During operation of the water heating system 10, heat transport liquid circulates through the solar collector tube 154 when the pump 156 is operating. The tube and fins are heated by solar radiation incident on the solar collector 18 and transfer heat to the liquid in the tube to heat the liquid. Efficient heat transfer from the tube to the heat transport liquid is attained by pumping the liquid through the tube at a velocity high enough to attain a Reynolds number of greater than 4,000 so as to effect turbulent rather than laminar flow through the tube.

Reference is now made to FIGS. 4 and 5 illustrating one of the solar and water tank heat exchangers 34. It is significant to note at the outset that the illustrated heat exchanger is designed for installation in an electrically heated water heater having removable electrical heating elements which are inserted through openings in the heater tank wall and have mounting plates secured to the tank wall about the opening. The heat exchanger 34 is installed in the tank by removing a heating element and inserting the heat exchanger in its place. In this disclosure, it is assumed that both the solar tank 12 and the water tank 14 comprise such conventional water heaters. The lower heating element of the water tank and both heating elements of the solar tank are removed and replaced by heat exchangers 34 as shown in FIG. 1.

It will be understood, therefore, that the present cascade storage water heating system may be incorporated in an existing domestic hot water system having an electrical heating tank by adding a second heating tank and installing heat exchangers 34 in the tanks, as described. When the existing hot water system has no such electrical heating tank, the existing tank may be utilized as the water tank 14, assuming the heat exchangers may be installed in or around the tank. It is within the scope of the invention, of course, to utilize solar and water tanks which are specially constructed to embody heat exchangers for use in the present invention or to use other than electrical heating tanks of the kind described which are modified to receive the heat exchangers 34.

Proceeding now to a description of the heat exchanger 34 in FIGS. 4 and 5, the heat exchanger has a mounting plate 162 and a heat exchange tube 164. Mounting plate 162 is shaped and sized to mount on an electrical water tank in the same manner as and in place of the mounting plate of the removable heating element. Heat exchanger tube 164 is preferably a smooth surface metal tube which is sufficiently resilient to deform and spring back in the manner explained below, although it could be made with a convoluted surface.

Tube 164 is bent into the configuration shown, and has a pair of parallel end sections 166, 168 whose free extremities extend through and are brazed or otherwise joined and sealed to the mounting plate 162. Provision is made for coupling these extremities of the tube 164 to the heat transport liquid lines of the water heating system in FIG. 1. Extending parallel to and located outward or horizontally offset of the tube end sections 166, 168, respectively, are intermediate tube sections 170, 172. These intermediate tube sections are joined at their ends remote from the mounting plate 162 to their respective tube end sections by U-shaped return bends 174, 176 and at their end adjacent the mounting plate to one another by a U-bend 178. This latter U-bend crosses over the tube end sections, as shown.

The resulting tube structure forms a pair of tube arms 182, 184. These arms have acute angle bends 186 between their ends, whereby the tube arms are generally V-shaped arms in side elevation having base portions 188 adjacent and generally normal to the plane of the mounting plate 162 and opposite free end portions 190 which incline back towards the plane of the mounting plate.

The bent tube structure 164 is oriented relative to the mounting plate 162 in such a way that when the heat exchanger 134 is installed in a tank 12 or 14, with the tube arms 182, 184 in their normal, unstressed positions of FIG. 4, the arm base portions 188 are generally horizontal and the free end portions 190 of the arms are disposed in oblique angular relation with one another, with one arm end portion generally upright, and the other arm end portion inclined, as shown in FIG. 4.

As mentioned earlier, tube 164 is resilient to a degree. The degree of resiliency required is that necessary to fold or bend the tube end portions 190 to the positions of FIG. 5, wherein the free end portions are side by side as shown. The tube arms 182, 184 are sized and the return bends 174, 176, 178 are staggered, as shown, in such a way that when the tube is folded to the position of FIG. 5 the major transverse dimension of the bent tube structure, at every transverse cross section therealong, is smaller than the heating element openings (not shown) in the tanks 12, 14, whereby the folded or bent heat exchanger of FIG. 5 may be inserted through such a tank opening. Upon insertion of the heat exchanger into the tank, the heat exchanger arms 182, 184 are released to spring back to their normal positions of FIG. 4 within the tank. The arms are horizontally displaced, as are all the sections thereof, as shown, when installed in the tank in order to effect more efficient heat transfer to the water in the tank than would occur, for example, if one arm or section were directly over another arm or section.

It will now be understood that, during operation of the water heating system 10, heat transport liquid flows through the heat exchangers 34 to transfer heat to the water in the solar and water tanks 12, 14. As in the case of the solar collector 18, heat transport liquid flow through the heat exchangers is preferably turbulent flow in order to enhance heat transfer from the liquid to the heat exchanger tubes and thereby from the tubes into the water. While the invention has been described in connection with a water heating system in which the heat transport liquid flows through heat exchangers in the solar tank 12 and water tank 14, it will be evident to those skilled in the art that the heat exchangers might be eliminated to permit use of the water in the tanks as the heat transport liquid, which is circulated through the solar collector 18.

I claim:

1. A solar energy augmented water heating system, such as a domestic hot water system, comprising:
   a water storage and heating tank including a water heater,
   a solar energy storage tank,
   means for conducting water through said solar tank and then through said water tank,
   a solar collector, and
   heat transport liquid circulating means responsive to the collector temperature $t_c$, the solar tank temperature $t_s$, and the water tank temperature $t_w$ for circulating a heat transport liquid selectively either through said collector and said solar tank when $t_c$ exceeds $t_s$ and $t_w$ at least equals a preset set point temperature $t_h$, or through said collector, said water tank, and then through said solar tank in response to at least one of the conditions (a) $t_c$ exceeds $t_w$ and $t_w$ is less than $t_h$, and (b) $t_c$ exceeds $t_w$ by a preset temperature differential.

2. A heating system according to claim 1 wherein
   said transport liquid circulating means circulates said transport liquid through said collector, said water tank, and then said solar tank in response to each of said conditions (a) and (b).

3. A heating system according to claim 1 including:
   means responsive to said temperature $t_c$, $t_w$, and $t_h$ for turning said water heater on when $t_w$ equals or is less than a given temperature $t_l$ less than $t_h$ and turning said heater off when $t_c$ exceeds $t_h$ and $t_w$ exceeds $t_l$ and when $t_w$ at least equals $t_h$.

4. A water heating system according to claim 3 wherein:
   said transport liquid circulating means circulates said transport liquid through said collector and solar tank when $t_c$ drops to or below a given minimum collector temperature.

5. A water heating system according to claim 1 wherein:
   said transport liquid circulating means circulates said transport liquid through said collector and solar tank when $t_c$ drops to or below a given minimum collector temperature.

6. A water heating system according to claim 1 wherein:
   said transport liquid circulating means comprises a heat exchanger in each tank through which said heat transport liquid flows.

7. A solar energy augmented water heating system, such as a domestic hot water system, comprising:
   a water storage and heating tank including a water heater,
   a solar energy storage tank,
   means for conducting water through said solar tank and then through said water tank,
   a solar collector,
   heat transport liquid recirculating means defining a normal liquid recirculating flow path through said collector and solar tank and a cascade recirculating liquid flow path through said collector, said water tank, and then said solar tank, and
   means for circulating a heat transport liquid through said normal flow path when $t_c$ exceeds $t_s$ and $t_w$ at least equals a preset set point temperature $t_h$ and through said cascade flow path in response to at least one of the conditions (a) $t_c$ exceeds $t_w$ and $t_w$ is less than $t_h$, and (b) $t_c$ exceeds $t_w$ by a preset temperature differential.

8. A water heating system according to claim 7 wherein:
   said transport liquid circulating means recirculates said transport liquid to said cascade flow path in response to each of said conditions (a) and (b).

9. A heating system according to claim 6 including:
   means responsive to said temperature $t_c$, $t_w$, and $t_h$ for turning said water heater on when $t_w$ equals or is less than a given temperature $t_l$ less than $t_h$ and turning said heater off when $t_c$ exceeds $t_h$ and $t_w$ exceeds $t_l$ and when $t_w$ at least equals $t_h$.

10. A water heating system according to claim 7 wherein:
    said heat transport liquid circulating means comprises pump means for pumping the transport liquid through said flow paths, cascade controller valve means for selectively directing said transport liquid through either flow path, temperature sensors responsive to said temperature $t_c$, $t_s$, and $t_w$, and control means connected to said sensors, pump means, and valve means for operating said pump means and valve means in response to said temperatures $t_c$, $t_s$, and $t_w$.

11. A water heating system according to claim 10 wherein:
    said control means is connected to said water heater for turning said heater on when $t_w$ is less than a temperature $t_l$ lower than $t_h$ and turning said heater off when $t_c$ exceeds $t_h$ and $t_w$ exceeds $t_l$ or when $t_w$ at least equals $t_h$.

12. A water heating system according to claim 7 wherein:
    said transport liquid circulating means circulates the transport liquid through said normal flow path when $t_c$ is equal to or less than a given minimum collector temperature.

13. A water heating system according to claim 7 wherein:
    said transport liquid circulating means comprises a heat exchanger in each tank through which said heat transport liquid flows.

14. A solar energy augmented water heating system, such as a domestic hot water system, comprising:
    a water storage and heating tank, including a water heater,
    a solar energy storage tank,
    means for conducting water through said solar tank and then through said water tank,
    a solar collector,
    means for conducting a heat transport liquid through said collector and tanks, including valve means having normal and cascade positions, means defining a normal transport liquid flow path from said collector, through said valve means and said solar tank back to said collector when said valve means occupies said normal position, and a cascade transport liquid flow path from said collector through said valve means, said water tank, and then said solar tank back to said collector when said valve means occupies said cascade position,
    pump means for pumping said transport liquid through said flow paths, and
    control means responsive to the collector temperature $t_c$, the solar tank temperature $t_s$, and the water tank temperature $t_w$ for controlling said pumping means and valve means to recirculate said heat transport liquid through said first flow path when $t_c$ exceeds $t_s$ and $t_w$ at least equals a maximum set point temperature $t_h$ and through said cascade flow path in response to at least one of the conditions: (a) $t_c$ exceeds $t_w$ and $t_w$ is less than $t_h$, and (b) $t_c$ exceeds $t_w$ by a preset temperature differential.

15. A water heating system according to claim 14 wherein:
said collector and each tank has a transport liquid inlet and outlet,
said valve means has an inlet, a first outlet which communicates with said valve inlet in said normal valve position, and a second outlet which communicates with the valve inlet in said cascade valve position,
said flow path defining means comprises a first liquid line connecting said collector outlet to said valve inlet, a second liquid line connecting said first valve outlet to said solar tank inlet, a third liquid line connecting said solar tank outlet to said collector inlet, a fourth liquid line connecting said second valve outlet to said water tank inlet, and a fifth liquid line connecting said water tank outlet to said second liquid line, and
said pumping means comprises a pump in said normal flow path.

16. A water heating system according to claim 15 wherein:
said control means includes means for turning said water heater on when $t_w$ is less than a minimum set point temperature $t_l$ below $t_h$ and turning said heater off when $t_c$ exceeds $t_h$ and $t_w$ exceeds $t_l$ or when $t_w$ at least equals $t_h$.

17. A water heating system according to claim 16 wherein:
said flow path defining means comprises a heat exchanger in each tank connecting the tank inlet and outlet.

18. A water heating system according to claim 17 wherein:
said transport liquid circulating means circulates the transport liquid through said normal flow path when $t_c$ is equal to or less than a given minimum collector temperature.

19. A solar energy augmented water heating method comprising the steps of:
conducting water to be heated through a solar energy storage tank and then through a water storage and heating tank including a water heater,
activating said heater when the water temperature in said water tank drops below a minimum set point temperature $t_l$ and inactivating said heater when the water temperature in said water tank rises to a maximum set point temperature $t_h$,
circulating a heat transport liquid through a solar collector and said solar tank when the collector temperature $t_c$ exceeds the solar tank temperature $t_s$ and the water tank temperature $t_w$ at least equals $t_h$ and through said collector, said water tank, and then said solar tank in response to at least one of the conditions: (a) $t_c$ exceeds $t_w$ and $t_w$ is less than $t_h$, and (b) $t_c$ exceeds $t_w$ by a preset temperature differential.

20. The solar energy augmented water heating method of claim 19 wherein:
the heat transport liquid is circulated through said collector, said water tank, and then solar tank in response to each of said conditions (a) and (b).

21. The solar energy augmented water heating method of claim 20 including the additional step of shutting off said heater when $t_c$ exceeds $t_h$ and $t_w$ exceeds $t_l$.

22. A solar energy augmented water heating system, such as a domestic hot water system, comprising:
a water storage and heating tank including a water heater,
a solar energy storage tank,
means for conducting water through said solar tank and then through said water tank,
a solar collector, and
means for circulating a heat transport liquid selectively either through said collector and said solar tank or through said collector, said water tank, and then through said solar tank.

23. A solar energy augmented water heating system, such as a domestic hot water system, comprising:
a water storage and heating tank including a water heater,
a solar energy storage tank,
means for conducting water through said solar tank and then through said water tank,
a solar collector,
means defining a normal liquid recirculating flow path through said collector and solar tank and a cascade recirculating liquid flow path through said collector, said water tank, and then said solar tank, and
means for circulating a heat transport liquid selectively through said normal flow path and through said cascade flow path.

24. A solar energy augmented water heating system, such as a domestic hot water system, comprising:
a water storage and heating tank, including a water heater,
a solar energy storage tank,
means for conducting water through said solar tank and then through said water tank,
a solar collector,
means for conducting a heat transport liquid through said collector and tanks, including valve means having normal and cascade positions, means defining a normal transport liquid flow path from said collector, through said valve means and said solar tank back to said collector when said valve means occupies said normal position and a cascade transport liquid flow path from said collector through said valve means, said water tank, and then said solar tank back to said collector when said valve means occupies said cascade position, and
pump means for pumping said transport liquid through said flow paths.

* * * * *

UNITED STATES PATENT OFFICE
CERTIFICATE OF CORRECTION

PATENT NO. : 4,052,000
DATED : October 4, 1977
INVENTOR(S) : Terence C. Honikman It is certified that error appears in the above-identified patent and that said Letters Patent are hereby corrected as shown below:

Column 6, line 67, change the "Cascade Storage" equation for pump "on" from "$t_c > t_w 30N$" to --$t_c > t_w + N$--.

Column 12, line 6, in claim 9, change "6" to --7--.

Signed and Sealed this

Eighteenth Day of April 1978

[SEAL]

Attest:

RUTH C. MASON
*Attesting Officer*

LUTRELLE F. PARKER
*Acting Commissioner of Patents and Trademarks*